United States Patent
Jones et al.

(10) Patent No.: US 8,307,375 B2
(45) Date of Patent: *Nov. 6, 2012

(54) COMPENSATING FOR INSTRUMENTATION OVERHEAD USING SEQUENCES OF EVENTS

(75) Inventors: Scott Thomas Jones, Austin, TX (US); Frank Eliot Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1133 days.

This patent is subject to a terminal disclaimer.

(21) Appl. No.: 11/863,092

(22) Filed: Sep. 27, 2007

(65) Prior Publication Data

US 2009/0089801 A1  Apr. 2, 2009

(51) Int. Cl.
- G06F 3/00 (2006.01)
- G06F 9/44 (2006.01)
- G06F 9/46 (2006.01)
- G06F 13/00 (2006.01)

(52) U.S. Cl. .................................. 719/320; 717/158

(58) Field of Classification Search .................. 719/320; 717/158
See application file for complete search history.

(56) References Cited

U.S. PATENT DOCUMENTS

| | | | |
|---|---|---|---|
| 6,507,805 B1 | 1/2003 | Gordon et al. | |
| 6,598,012 B1 | 7/2003 | Berry et al. | |
| 6,732,357 B1 * | 5/2004 | Berry et al. | 717/158 |
| 6,865,736 B2 | 3/2005 | Holmberg et al. | |
| 2006/0106975 A1 | 5/2006 | Bellows et al. | |
| 2009/0089800 A1 | 4/2009 | Jones et al. | |

FOREIGN PATENT DOCUMENTS

JP  2005177953 A  7/2006

OTHER PUBLICATIONS

Malony et al, Overhead Compensation in Performance profiling, Springer-Verlag Berlin Heidelberg, LNCS 3149, 2004, pp. 119-132.*
Wolf et al, Trace-based Parallel Performance Overhead Compensation, Springer-Verlag Berlin Heidelberg, LNCS 3726, 2005, pp. 617-628.*
Nagpurkar et al., "Efficient Remote Profiling for Resource=Constrained Devices", ACM Transactions on Architecture and code Optimization, vol. 3, No. 1, Mar. 2006, pp. 35-66.
Raasch et al., "A Scalable Instruction Queue Design Using Dependence Chains", IEEE, 2002, pp. 318-329.
USPTO Office Action regarding U.S. Appl. No. 11/863,085, dated Jun. 8, 2011.
USPTO Final Office Action regarding U.S. Appl. No. 11/863,085, dated Oct. 11, 2011.

* cited by examiner

*Primary Examiner* — Diem Cao
(74) *Attorney, Agent, or Firm* — Yee & Associates, P.C.; David A. Mims, Jr.

(57) ABSTRACT

A computer implemented method, apparatus, and computer program product for processing events. Events occurring during execution of an application are monitored to form monitored events. A plurality of sequences of method types and transition types from the monitored events are identified to form an identified plurality of sequences of method types and transitions types. Overhead compensation values are identified for the identified plurality of sequences of method types and transitions types to form identified overhead compensation values. Observed metrics for the monitored events are adjusted using the identified overhead compensation values.

20 Claims, 9 Drawing Sheets

COMPENSATING FOR INSTRUMENTATION OVERHEAD USING SEQUENCES OF EVENTS

BACKGROUND OF THE INVENTION

1. Field of the Invention

The present invention relates generally to an improved data processing system and in particular to a method and apparatus for optimizing performance in a data processing system. Still more particularly, the present invention provides a computer implemented method, apparatus, and computer usable program code for identifying and adjusting for overhead caused by instrumentation code.

2. Description of the Related Art

In analyzing and enhancing performance of a data processing system and the applications executing within the data processing system, it is helpful to know which software modules, routines, and/or methods executing on a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most input/output requests. Hardware performance tools may be built into the system or added at a later point in time. Software performance tools also are useful in data processing systems, such as personal computer systems, which typically do not contain many, if any, built-in hardware performance tools.

One known software performance tool is a profiler. A profiler is a program that monitors the execution of an application or program using one or more metrics. These metrics may take various forms. For example, the metrics tracked by a profiler may include, for example, without limitation, the cycles and number of instructions executed. With instructions, the number of instructions executed while a routine is active also may be tracked. These and other metrics are examples of information that may be collected by a profiler for analysis and for use to improve performance of an application.

One example of a profiler is a trace tool, which may use more than one technique to provide trace data that indicates execution flows for an executing program. One technique keeps track of particular sequences of instructions by logging certain events as they occur. This technique is referred to as an event-based profiling technique. For example, a trace tool may log every entry into and every exit from a module, subroutine, method, function, or system component. Alternately, a trace tool may log the requester and the amounts of memory allocated for each memory allocation request. Corresponding pairs of records similar to entry-exit records also are used to trace the execution of arbitrary code segments, starting and completing input/output or data transmission, and for many other events of interest.

Measuring execution of code in a data processing system perturbs the data processing system. In other words, monitoring the execution causes changes in the execution that would not be present if the monitoring did not occur. This effect is well understood in the study of elementary particle physics and is known as the Heisenberg uncertainty principle. With software profiling, the cost associated with the tracing can severely affect the system being profiled. The effect may include disruption of the cache or the instruction pipeline or simply the overhead associated with the tracing.

One effect that may be measured is the overhead associated with the execution of instrumentation code within the execution flows of the application program. As the application program executes, the instrumentation may incur significant overhead in the form of calls to obtain system information, such as a call to obtain a current timestamp for a trace record. This cost also is referred to as instrumentation overhead.

Therefore, it would be advantageous to provide a method and system to compensate for the disruptions described above during the profiling of code.

SUMMARY OF THE INVENTION

The different embodiments provide a computer implemented method, apparatus, and computer program code for processing events. Events occurring during execution of an application are monitored to form monitored events. A plurality of sequences of method types and transition types from the monitored events are identified to form an identified plurality of sequences of method types and transitions types. Overhead compensation values are identified for the identified plurality of sequences of method types and transitions types to form identified overhead compensation values. Observed metrics for the monitored events are adjusted using the identified overhead compensation values.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
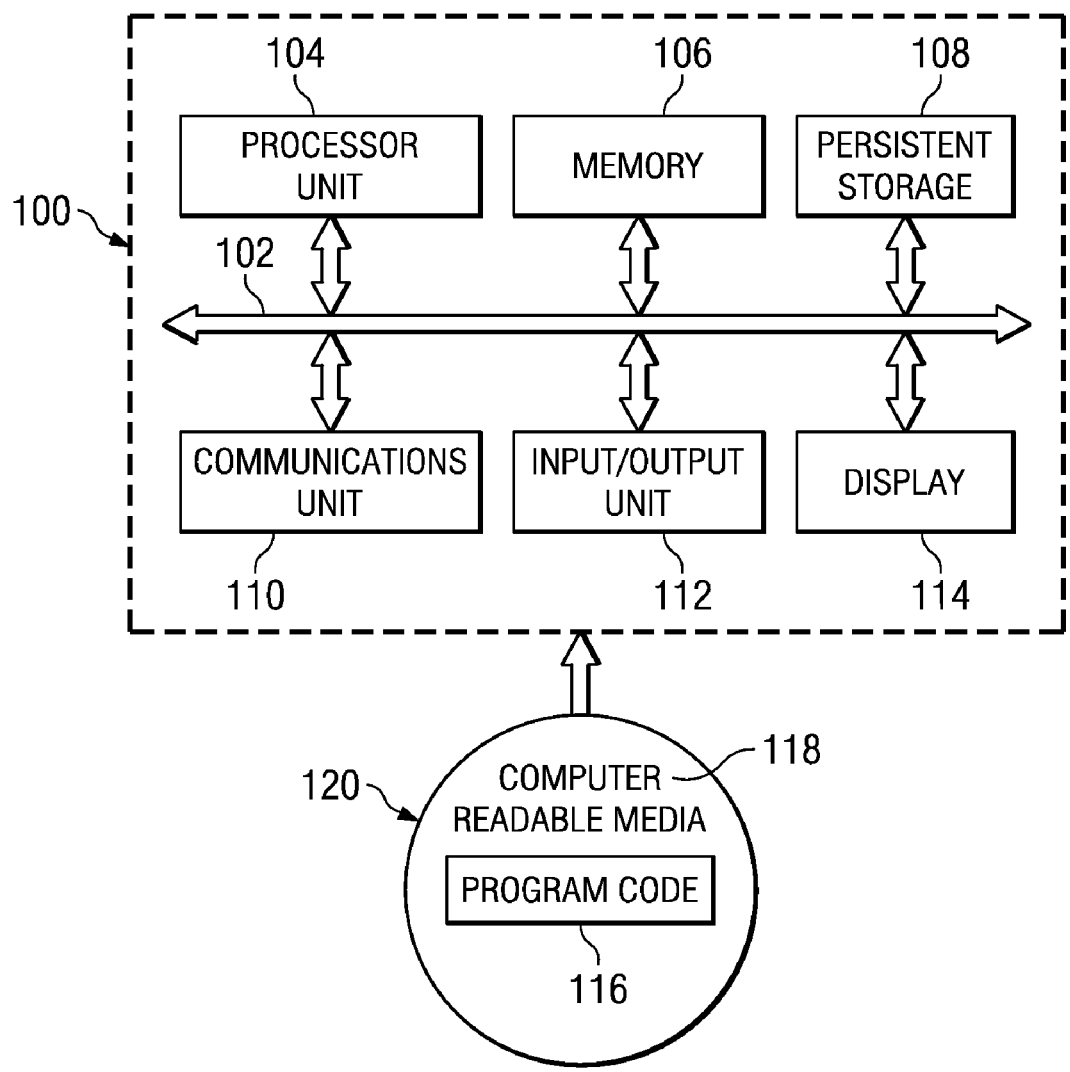
FIG. 1 is a diagram of a data processing system in accordance with an illustrative embodiment.

Turning now to FIG. 1, a diagram of a data processing system is depicted in accordance with an illustrative embodiment of the present invention. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106, in these examples, may be, for example, a random access memory. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as, program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive or a flash memory that is connected to data processing system 100. The tangible form of computer readable media 118 is also referred to as computer recordable storage media.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

For example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
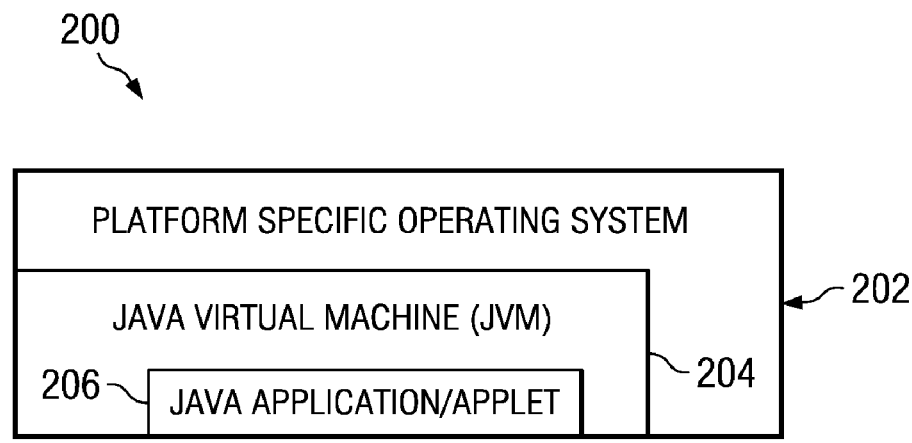
FIG. 2 is a block diagram illustrating the relationship of software components operating within a computer system in accordance with an illustrative embodiment.

With reference now to FIG. 2, a block diagram illustrates the relationship of software components operating within a computer system that may implement the present invention. Java®-based system 200 contains platform specific operating system 202 that provides hardware and system support to software executing on a specific hardware platform. Java® virtual machine (JVM) 204 is one software application that may execute in conjunction with the operating system. Java® virtual machine 204 provides a Java® run-time environment with the ability to execute Java® application/applet 206, which is a program, servlet, or software component written in the Java® programming language. The computer system in which Java® virtual machine 204 operates may be similar to data processing system computer 100 in FIG. 1. However, Java® virtual machine 204 may be implemented in dedicated hardware on a so-called Java® chip, Java®-on-silicon, or Java® processor with an embedded picoJava® core.

Java® virtual machine 204 supports all aspects of Java®'s environment, including its architecture, security features, mobility across networks, and platform independence.

The Java® virtual machine is the name of a virtual computer component that actually executes Java® programs. This flexibility allows different Java® virtual machines to be designed for mainframe computers and PDAs. Java® programs are not run directly by the central processor but instead by the Java® virtual machine, which is itself a piece of software running on the processor. The Java® virtual machine allows Java® programs to be executed on a different platform as opposed to only the one platform for which the code was compiled. Java® programs are compiled for the Java® virtual machine. In this manner, a Java® environment is able to support applications for many types of data processing systems, which may contain a variety of central processing units and operating systems architectures. To enable a Java® application to execute on different types of data processing systems, a compiler typically generates an architecture-neutral file format. The compiled code is executable on many processors, given the presence of the Java® run-time system. The Java® compiler generates bytecode instructions that are non-specific to a particular computer architecture. A bytecode is a machine independent code generated by the Java® compiler and executed by a Java® interpreter. A Java® interpreter is part of the Java® virtual machine that alternately decodes and interprets a bytecode or bytecodes. These bytecode instructions are designed to be easy to interpret on any computer and easily translated on the fly into native machine code. Bytecodes are may be translated into native code by a just-in-time compiler or JIT.

A Java® virtual machine loads class files and executes the bytecodes within them. The Java® virtual machine contains a class loader, which loads class files from an application and the class files from the Java® application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java® bytecodes are executed natively. Java® virtual machines usually interpret bytecodes, but Java® virtual machines may also use other techniques, such as just-in-time compiling, to execute bytecodes.

Interpreting code provides an additional benefit. Rather than instrumenting the Java® source code, the interpreter may be instrumented. Trace data may be generated via selected events and timers through the instrumented interpreter without modifying the source code. Profile instrumentation is discussed in more detail further below. Further, many times the Java® virtual machine itself may provide interfaces for obtaining information about processes and threads executing in the Java® environment.

When an application is executed on a Java® virtual machine that is implemented in software on a platform-specific operating system, a Java® application may interact with the host operating system by invoking native methods. A Java® method is written in the Java® language, compiled to bytecodes, and stored in class files. A native method is written in some other language and compiled to the native machine code of a particular processor. Native methods are stored in a dynamically linked library whose exact form is platform specific.

Figure 3:
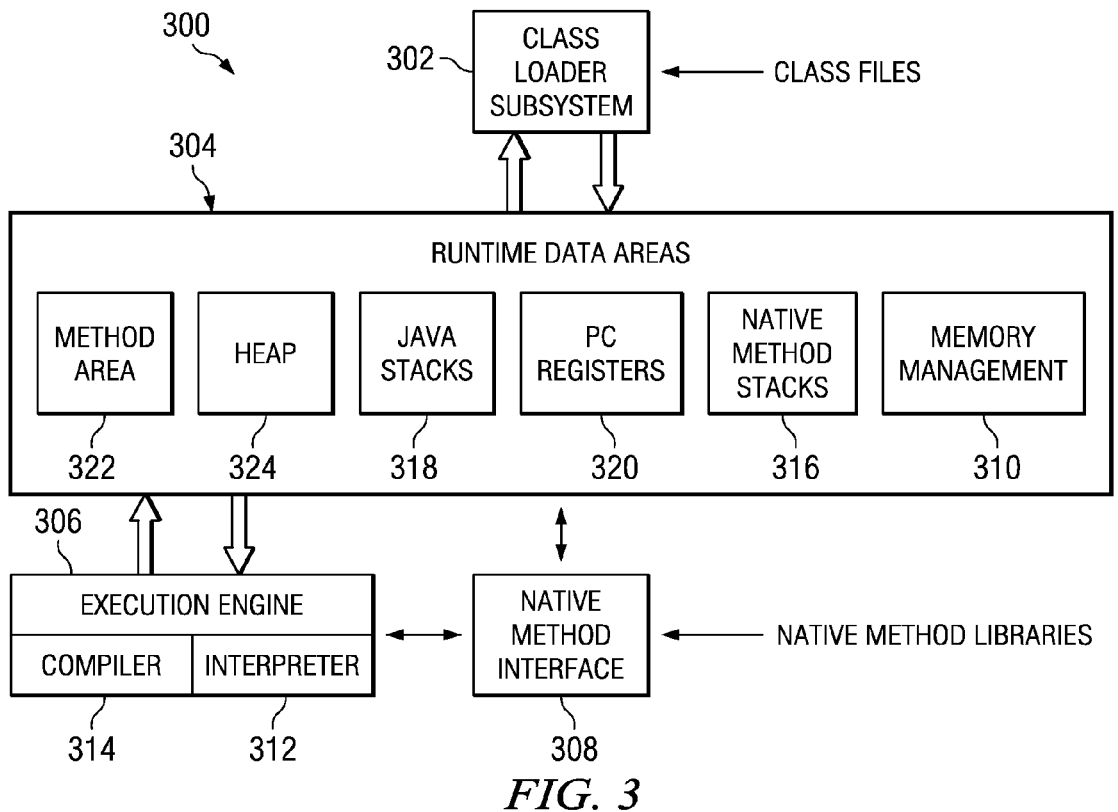
FIG. 3 is a block diagram of a Java® virtual machine in accordance with an illustrative embodiment.

With reference now to FIG. 3, a block diagram of a Java® virtual machine is depicted in accordance with an illustrative embodiment. Java® virtual machine 300 includes class loader subsystem 302, which is a mechanism for loading types, such as classes and interfaces, given fully qualified names. Java® virtual machine 300 also contains runtime data areas 304, execution engine 306, native method interface 308, and memory management 310. Execution engine 306 is a mechanism for executing instructions contained in the methods of classes loaded by class loader subsystem 302. Execution engine 306 may be, for example, Java® interpreter 312 or just-in-time compiler 314. Native method interface 308 allows access to resources in the underlying operating system. Native method interface 308 may be, for example, a Java® native interface.

Runtime data areas 304 contain native method stacks 316, Java stacks 318, PC registers 320, method area 322, and heap 324. These different data areas represent the organization of memory needed by Java® virtual machine 300 to execute a program.

Java® stacks 318 are used to store the state of Java® method invocations. When a new thread is launched, the Java® virtual machine creates a new Java® stack for the thread. The Java® virtual machine performs only two operations directly on Java® stacks: it pushes and pops frames. A thread's Java® stack stores the state of Java® method invocations for the thread. The state of a Java® method invocation includes local variables, the parameters with which the thread was invoked, return value, if any, and intermediate calculations for the method. Java® stacks are composed of stack frames. A stack frame contains the state of a single Java® method invocation. When a thread invokes a method, the Java® virtual machine pushes a new frame onto the Java® stack of the thread. When the method completes, the Java® virtual machine pops and discards the frame for that method. The Java® virtual machine does not have any registers for holding intermediate value. Any intermediate values are stored in a call stack.

PC registers 320 indicate the next instruction to be executed. Each instantiated thread has its own program counter register and Java® stack. If the thread is executing a Java® virtual machine method, the value of the program counter register indicates the next instruction to execute. If the thread is executing a native method, then the contents of the program counter register are undefined.

Native method stacks 316 store the state of invocations of native methods. The state of native method invocations is stored in an implementation-dependent way in native method stacks, registers, or other implementation-dependent memory areas. In some Java® virtual machine implementations, native method stacks 316 and Java® stacks 318 are combined.

Method area 322 contains class data while heap 324 contains all instantiated objects. The Java® virtual machine specification strictly defines data types and operations. Most Java® virtual machines choose to have one method area and one heap, each of which are shared by all threads running inside the Java® virtual machine. When the Java® virtual machine loads a class file, the Java® virtual machine parses information about a type from the binary data contained in the class file.

The Java® virtual machine places this type information into the method area. Each time a class instance or array is created, the memory for the new object is allocated from heap 324. Java® virtual machine 300 includes an instruction that allocates memory space within the memory for heap 324 but includes no instruction for freeing that space within the memory. Memory management 310 in the depicted example manages memory space within the memory allocated to heap 324. Memory management 310 may include a garbage collector which automatically reclaims memory used by objects that are no longer referenced. Additionally, a garbage collector also may move objects to reduce heap fragmentation.

The illustrative embodiments provide a computer implemented method, apparatus, and computer usable program code for processing events. Events occurring during the execution of an application are monitored to form monitored events. A plurality of sequences of method types and transition types are identified from the monitored events.

The different illustrative embodiments provide a computer implemented method, apparatus, and computer usable program code for monitoring execution of an application. Events occurring during execution of the application while during monitoring execution of the application are identified to form a set of observed events. An execution environment overhead occurring with respect to the set of observed events is identified to form an identified execution environment overhead. The set of observed metrics for the observed events is adjusted using the identified execution environment overhead to form a set of calibrated metrics. As used herein, a set refers to one or more items. For examples, a set of events may be one or more events. As another example, a set of values contains one or more values.

In some embodiments, monitoring of events occurring during execution of an application to form monitored events occurs. Event types are identified from the monitored events. Environmental overhead values are identified for the identified event types to form identified environmental overhead values. Overhead compensation values are identified for the identified event types to form identified overhead compensation values. Overhead compensation values are adjusted for the identified event types using the identified environmental overhead values to form identified environment overhead compensation values. Observed metrics for the monitored events are adjusted using the identified environmental overhead compensation values.

The different embodiments provide at least two mechanisms for calibrating overhead observed during execution of an application. In one embodiment, the sequences of transition types and method types are considered. In another embodiment, the execution environment overhead without instrumentation of an application is used. These two techniques may be used independently or in conjunction with each other to calibrate data collected or observed during execution of an application.

Figure 4:
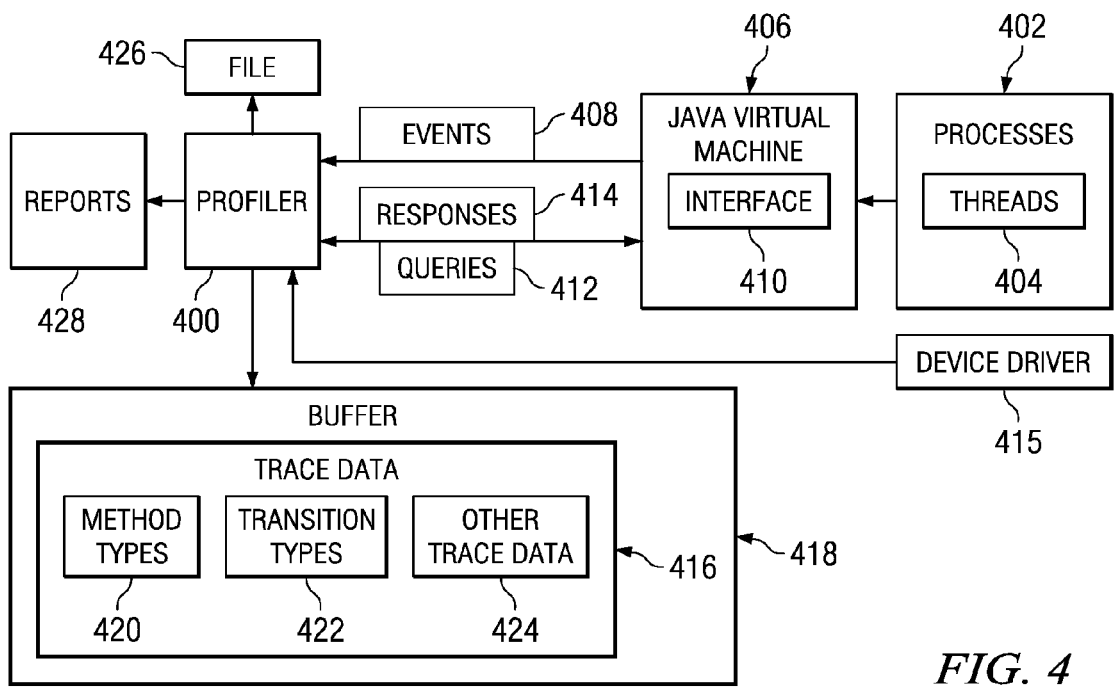
FIG. 4 is a block diagram of components used to identify method types and transition types in accordance with an illustrative embodiment.

With reference now to FIG. 4, a block diagram of components used to identify method types and transition types is depicted in accordance with an illustrative embodiment. In this example, these components are used to identify method types and transition types. This information is then used to identify the amount of overhead that occurs from instrumentation code being included to profile or identify performance of programs or other codes executing on a data processing system. This type of overhead is also referred to as instrumentation overhead.

In these examples, profiler 400 profiles processes 402. In particular, profiler 400 may identify information about threads 404 executing within processes 402.

Processes 402 are executed by Java® virtual machine 406, in these examples. As threads 404 execute, Java® virtual machine 406 generates events 408. Events 408 may be, for example, entry and exit events into and out of methods, which are transitions between methods. The generation of events 408 may be initiated using various mechanisms. In these examples, events 408 are self-instrumented by Java® virtual machine 406. In other embodiments, other mechanisms may be used. For example, without limitation, hooks may be used, in some cases.

Events 408 are sent to profiler 400 through interface 410 in Java® virtual machine 406. These interfaces may take various forms. For example, interface 410 may be a Java® virtual machine tool interface (JVMTI) or a Java® virtual machine profiling interface (JVMPI). With these types of interfaces, events 408 are generated as part of callouts to profiler 400. The Java® virtual machine tool interface is a native interface within Java® virtual machine 406 that is available in Java® 5 Software Development Kit (SDK). The Java® virtual machine profiling interface is available in both the Java® 2 Platform, Standard Edition (J2SE) SDK and Java 5. These kits are available from Sun Microsystems, Inc.

In response to receiving events 408 from interface 410, profiler 400 may send queries 412 to Java® virtual machine 406 through interface 410. Queries 412 may be used to identify information, such as method types. In Java® environments, these method types may include, for example, at least one of jitted static methods, jitted non-static methods, interpreted static methods, interpreted non-static methods, native static methods, and native non-static methods. In these examples, at least one of means one of more of the items in the list. As an example, at least one of may include just jitted static methods or jitted static methods and interpreted static methods. In other examples, one method may be present for each of the method types.

Responses 414 from interface 410 may include this information. In some cases, the information may be derived from method identifiers. This method identifier may be used to determine the type of method executing in threads 404. In some embodiments, the type of method or method type may be identified from events 408. In these embodiments, the event may identify the method as jitted, interpreted, or native. Also, profiler 400 may make a call to device driver 415 or some other utility or code to obtain metric information. For example, profiler 400 may call device driver 415 to identify a number of instructions completed on threads and the differences between the number of instructions completed when transitioning from one method to another method. These differences are also referred to as deltas.

The information collected by profiler 400 forms trace information. Profiler 400 stores this trace information as trace data 416 within buffer 418. Trace data 416 may be structured as records. These records may correspond to events received in callouts from interface 410. In these examples, trace data 416 includes method types 420, transition types 422, and other trace data 424.

Trace data 416 may be organized in the form of records, in which each record contains information for a particular event that is received. Other trace data 424 may include, for example, accumulations of metric changes as well as adjustments to metrics. In these examples, other trace data 424 may include the number of instructions completed.

With this information, profiler 400 may identify instrumentation overhead generated by Java® virtual machine 406 self-instrumenting itself to create events 408 to profile the execution of threads 404 within processes 402.

Further, the different advantageous embodiments may include processes to compensate or "calibrate" for the identified instrumentation overhead. These processes may be found in a software component, such as profiler 400. The information about instrumentation may be used to adjust other trace record information to increase the accuracy of the observed execution of a program, process, and/or thread of interest.

Calibration is a process compensating for overhead caused by the execution of instrumentation when performance testing or profiling the execution of an application. In these examples, instrumentation or instrumentation code refers to the code that is executed to generate information about program execution or to record performance information about a running application.

In the illustrative examples, calibration is typically performed by identifying a smallest number of instructions executed between two consecutive events. That number is decremented by one and subtracted from all observed instruction counts. The decrement by one instruction is to take into account the call or return instruction itself. This result is intended to represent the number of instructions that would have been observed if no instrumentation had been inserted into the application.

The adjustment of the trace information may be performed dynamically during execution of the application or may be performed after the application has completed execution during post-processing.

In some illustrative embodiments, these adjustments are made dynamically or "on-the-fly" to trace data 416 in buffer 418 while an application executes. In other illustrative embodiments, trace data 416 may be post-processed after execution of the application is completed and then adjusted to take into account the instrumentation overhead. When the calibration is performed dynamically, profiler 400 may adjust trace data 416, while trace data 416 is still stored in buffer 418. Profiler 400 may then write trace data 416 into file 426 after execution of the application has completed. Profiler 400 may then generate reports 428 using the information in file 426.

In other illustrative embodiments, the calibration or adjustment for instrumentation overhead may be performed after execution of the application has completed and trace data 416 is stored in file 426. In this type of embodiment, profiler 400 adjusts the trace data within file 426 before generating reports 428.

As a result, the different illustrative embodiments provide a computer implemented method, apparatus, and computer usable program code for more accurately identifying instrumentation overhead. The different illustrative embodiments are especially useful when instrumentation occurs at entry and exit points of methods. The different illustrative embodiments also recognize that adjusting metrics involving instruction execution for these types of transitions by only one instruction does not take into account actual execution environment overhead.

Figure 5:
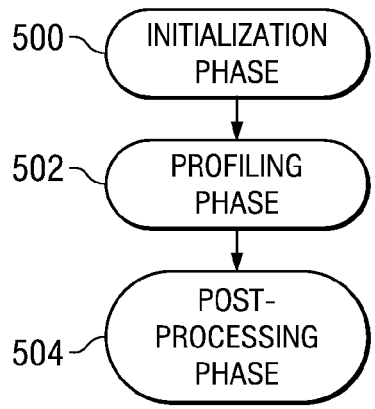
FIG. 5 is a state diagram illustrating different phases in profiling active processes in accordance with an illustrative embodiment.

With reference next to FIG. 5, a state diagram illustrating different phases in profiling active processes is depicted in accordance with an illustrative embodiment. The different states illustrated in FIG. 5 may be implemented using components described above with respect to FIG. 4. In particular, these components may include profiler 400, Java® virtual machine 406, and interface 410, with respect to the execution of threads 404 and processes 402 in FIG. 4.

Initialization phase 500 captures the state of the data processing system at the time tracing is initiated. This phase may include the collection of profiling data which is used later.

Next, during profiling phase 502, trace data in the form of trace records are written to a trace buffer or file, such as buffer 418 or file 426 in FIG. 4. The trace records originate from event-based profiling. Event-based records may originate from events generated by an interface in the Java® virtual machine in response to a particular type of event, such as a method entry or method exit. In some embodiments, calibration processes are performed to adjust the trace data to take into account instrumentation overhead during this phase.

In post-processing phase 504, the calibration or adjustment for instrumentation overhead may be performed.

Of course, depending on available resources, the post-processing also may be performed on the client data processing system.

Alternatively, trace information may also be processed on-the-fly so that trace data structures are maintained during profiling phase 502.

In the event-based traces, a fundamental assumption is made that entry-exit pairs are nested in the traces because routines call other routines. Time spent or memory consumed between entry into a routine and exit from the same routine is attributed to that routine. However, a user of a profiling tool may want to distinguish between time spent directly in a routine and time spent in other routines that it calls.

Figure 6:
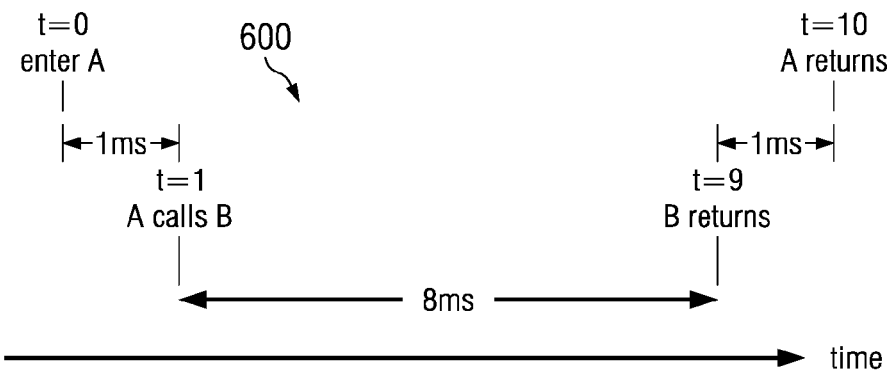
FIG. 6 is a time chart in accordance with an illustrative embodiment.

With reference now to FIG. 6, a time chart is depicted in accordance with an illustrative embodiment. In this example, time chart 600 illustrates an example of the manner in which time may be spent in two routines: an application's main calls routine A at time "t" equal to zero; routine A computes for 1 ms and then calls routine B; routine B computes for 8 ms and then returns to routine A; routine A computes for 1 ms and then returns to "main".

From the point of view of "main", routine A took 10 ms to execute, but most of that time was spent executing instructions in routine B and was not spent executing instructions within routine A. This information is useful for a person attempting to optimize the example program. In addition, if routine B is called from many places in the program, it might be useful to know how much of the time spent in routine B was on behalf of, or when called by, routine A and how much of the time was on behalf of other routines.

The post-processing of a trace file may result in a report consisting of three kinds of time spent in a routine, such as routine A: (1) base time, the time spent executing code in routine A itself; (2) cumulative time, the time spent executing in routine A plus all the time spent executing every routine that routine A calls (and all the routines they call, etc.); and (3) wall-clock time or elapsed time. This type of timing information may be obtained from event-based trace records, as these records have timestamp information for each record.

A routine's cumulative time is the sum of all the time spent executing the routine plus the time spent executing any other routine while that routine is below it on the call stack. In the example above in FIG. 6, routine A's base time is 2 ms, and its cumulative time is 10 ms. Routine B's base time is 8 ms, and its cumulative time is also 8 ms because it does not call any other routines. It should be noted that cumulative time may not be generated if a call stack tree is being generated on-the-fly.

If metrics are virtualized by synchronous events on thread, base and cumulative time are unaffected by interrupts, dispatching, or blocking. Base time only increases while a routine is running, and cumulative time only increases while the routine or a routine below it on the call stack is running.

In the example in FIG. 6, routine A's elapsed time is the same as its cumulative time, 10 ms. Changing the example slightly, suppose there was a 1 ms interrupt in the middle of B, as shown below in FIG. 7.

Figure 7:
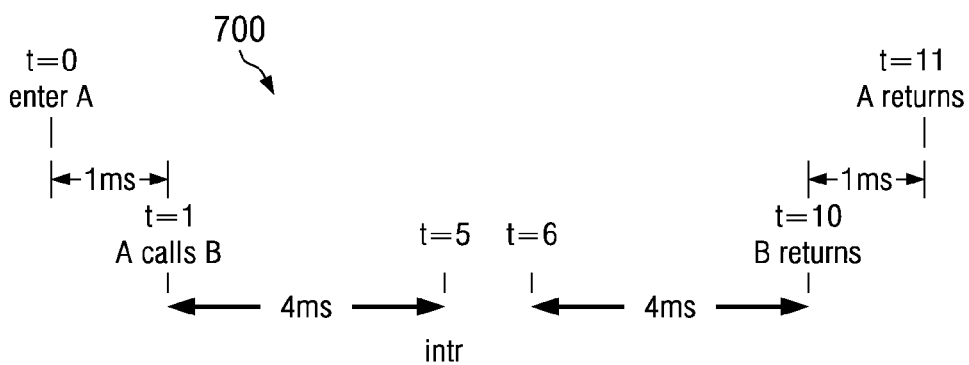
FIG. 7 is a time chart illustrating an interrupt in accordance with an illustrative embodiment.

With reference next to FIG. 7, a time chart illustrating an interrupt is depicted in accordance with an illustrative embodiment. In time chart 700, routine A's base and cumulative time are unchanged at 2 ms and 10 ms, but its elapsed time is now 11 ms.

More general definitions for the accounting concepts during profiling include the following: base, the amount of the tracked system resource consumed directly by this routine; cumulative, the amount of the tracked system resource consumed by this routine and all routines below it on the call stack; elapsed, the total amount of the tracked system resource consumed (by any routine) between entry to this routine and exit from the routine.

Figure 8:
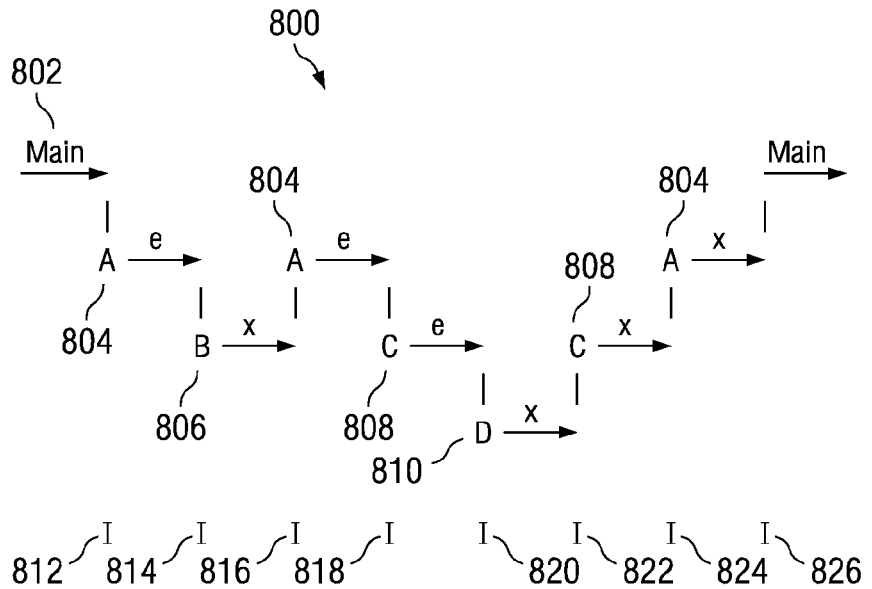
FIG. 8 is a diagram illustrating sources of instrumentation overhead in accordance with an illustrative embodiment.

With reference now to FIG. 8, a diagram illustrating sources of instrumentation overhead is depicted in accordance with an illustrative embodiment. Event flow diagram 800 illustrates events with respect to four subroutines in an application. Main 802 results in subroutine A 804, subroutine B 806, subroutine C 808, and subroutine D 810 being called. In this example, subroutine A 804 is called by main 802. In turn, subroutine A 804 calls subroutine B 806. Additionally, subroutine A 804 also calls subroutine C 808. Subroutine C 808 calls subroutine D 810.

In this example, an event occurs at each of transitions 812, 814, 816, 818, 820, 822, 824, and 826. Each of these transitions is either an entry to or an exit from a method. Instrumentation is used to generate an entry or exit event to obtain information about the execution of the application when these transitions occur. The different illustrative embodiments recognize that these transitions may include more instrumentation overhead than merely the instruction required to enter or exit a subroutine.

In this example, "e" represents a delta metric associated with an entry event, while "x" represents a delta metric associated with a method exit event. These delta metrics include the instrumentation overheads associated with each event. It is this instrumentation overhead that is removed in the various illustrative embodiments.

Previously, algorithms or processes used to remove instrumentation overhead operated by observing all entry and exit events and saving minimum observed values. These processes assumed that the minimum value is the result of a single call or return instruction between invocations of the instrumentation. This technique does not take into account the actual overhead associated with instrumentation of code during profiling.

The different illustrative embodiments recognize that the context in which the methods are invoked should be considered. In other words, the different illustrative embodiments recognize that other types of methods are being executed and also need to be identified. As a result, a series of method executions may have a number of variations of overhead, depending on the types of methods being invoked.

Further, the different illustrative embodiments also recognize that the execution of methods includes overhead that is present because of the environment in which the execution of the application occurs. This overhead is also referred to as execution environment overhead. Other overhead that occurs in addition to the execution environment overhead is considered instrumentation overhead. The instrumentation overhead is overhead that the different embodiments may adjust for in calibrating a set of metrics collected during monitoring the execution of the application. In addition and/or alternatively, adjustment for overhead may be performed based on sequences of method types and transition types. As a result, the overhead observed during execution may be calibrated using the sequence of transition types and method types and/or identifications of execution environment overhead.

In this example, information about method entry and method exit events may be captured and stored within a buffer. A device driver, such as device driver 415 in FIG. 4 may be used. With this type of implementation, the device driver may capture the current total number of instructions completed for a particular thread. Further, the device driver also may compute or identify the deltas or differences between the numbers of instructions.

Of course, other metrics may be used other than instructions. For example, time or cache misses may be used. In these examples, accuracy is improved by guaranteeing a constant overhead in the code that reads the metrics.

Figure 9:
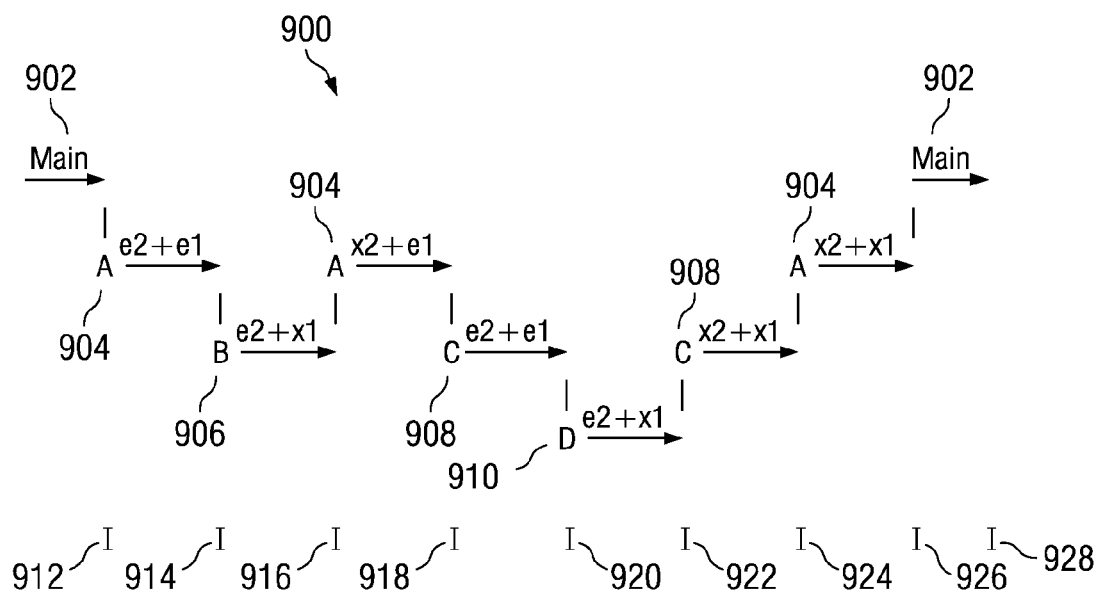
FIG. 9 is an event flow diagram in accordance with an illustrative embodiment.

With reference now to FIG. 9, an event flow diagram is depicted in accordance with an illustrative embodiment. In this example, event flow diagram 900 illustrates identifying different types of overhead to take into account entry and exit for different types of methods.

In this example, a Java® program, such as main 902, calls methods, such as method A 904, method B 906, method C 908, and method D 910. All of these methods are executed as subroutines prior to returning to main 902. In this example, main 902 calls method A 904, which in turn calls method B 906. Method B 906 exits back to method A 904, which then calls method C 908. Method C 908 calls method D 910. After executing, method D 910 exits back to method C 908, which exits to method A 904. Method A 904 then returns to main 902.

Transitions 912, 914, 916, 918, 920, 922, 924, 926, and 928 are events that occur during the execution of the application at which instrumentation is executed. The different illustrative embodiments adjust the observed delta metrics to remove overhead caused by the instrumentation. The different illustrative embodiments recognize that in addition to the type of transition, the context in which a transition occurs may affect the amount of instrumentation overhead. The adjustment also depends on the execution environment.

In this example, "e1" identifies pre-instrumentation entry overhead, "e2" identifies post-instrumentation entry overhead. Also, "x1" identifies pre-instrumentation exit overhead and "x2" identifies post-instrumentation exit overhead. Rather than identify the unique combinations of e1, e2, x1, and x2 for all method types, the illustrative embodiments identify sequences of method types and transition types.

This type of information may be used to identify the minimum overhead values for all combinations of entry and exit events followed by entry and exit events for all combinations of identifiable method types.

In these examples, the different minimum overhead values are identified for all combinations of entry and exit events followed by entry and exit events for all combinations of identifiable method events. These entry and exit events are transitions. In the Java® Virtual Machine (JVM), the identifiable method types include, but are not limited to, jitted static methods, jitted non-static methods, interpreted static methods, interpreted non-static methods, native static methods, and native non-static methods. In considering all sequences of methods and transitions, the transition types include, but are not limited to method entry and method exit. If only these method types and transition types are considered, a total of 6*2*6*2*6=864 possible sequences of two transitions from a first method to a second method to a third method are present. Some of these sequences will never occur, since a return from a method must be to the same type of method that called it. These are some of method types that may be found in a Java® programming environment. Others may exist in other programming environments. Other transition types, such as return due to exception process might also be considered.

Figure 10:
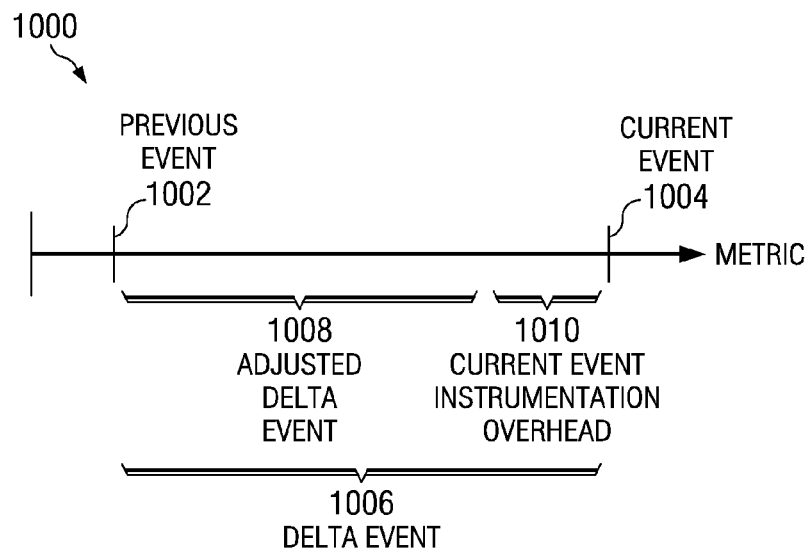
FIG. 10 is an event flow diagram in accordance with an illustrative embodiment.

With reference now to FIG. 10, an event flow diagram is depicted in accordance with an illustrative embodiment. In this example, event flow diagram 1000 illustrates a metric that changes between two events. These metrics may take various forms as described above. The metric may be, for example, without limitation, the number of instructions or the amount of time that has passed.

Previous event 1002 is the point at which a previous event has occurred, such as an entry event or an exit event. Current event 1004 is the point at which the subsequent event has been recorded as occurring, such as the next entry event or exit event. The difference between previous event 1002 and current event 1004 is delta event 1006.

The different embodiments are directed towards determining whether delta event 1006 contains identifiable instrumentation overhead. The different illustrative embodiments include processes to identify the amount of instrumentation overhead. In these examples, the instrumentation overhead may be quantified using different types of metrics. The particular metric may be, for example, time or a number of instructions.

The metric measured between these two events may include a portion that is attributed to the execution of the routine, as well as another portion that is attributed to the execution of code relating to instrumentation that facilitates recording or tracing of previous event 1002 and current event 1004. The portion of the recorded metric within delta event 1006 that is associated with the execution of the routine is referred to as adjusted delta event 1008. The portion of the delta event associated with the instrumentation overhead is referred to as event instrumentation overhead 1010.

The different illustrative embodiments may identify current event instrumentation overhead 1010 and subtract that value from delta event 1006 to obtain adjusted delta event 1008. Adjusted delta event 1008 more accurately identifies the value of the metric that is actually associated with executing a particular routine.

In the different examples, this metric may take the form of time or instructions. When time is used, adjusted delta event 1008 may be considered the base time of the routine.

Figure 11:
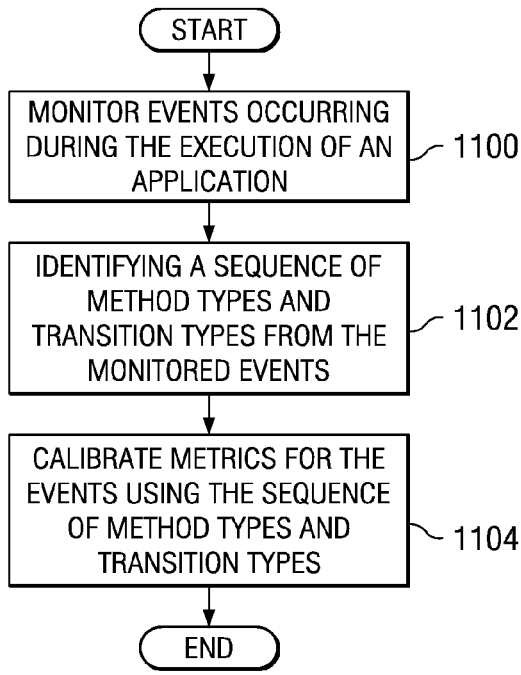
FIG. 11 is a high level flowchart of a process for calibrating metrics observed during execution of an application in accordance with an illustrative embodiment.

With reference now to FIG. 11, a high level flowchart of a process for calibrating metrics observed during the execution of an application is depicted in accordance with an illustrative embodiment. The process in this example may be applied to an observed metric on a per thread basis.

The process begins by monitoring events occurring during execution of an application (step 1100). In particular, the events may be selected once for a particular process or set of threads that execute for the application. This monitoring may be performed using an interface, such as interface 410 in Java® virtual machine 406 in FIG. 4.

Next, a sequence of method types and transition types are identified from the monitored events (step 1102). In this example, the method type identifies the type of method from the events. The process then calibrates metrics for the events using the sequence of method types and transition types (step 1104). The calibrating of the metrics for the events may be performed a number of different ways. In particular, overhead compensation values may be identified for each sequence of method types and transition types. These values represent the minimum metric value for a particular sequence of method types and transition types. This minimum value may be subtracted from the actual value for the observed or recorded sequence of method types and transition types to adjust that value to exclude the instrumentation overhead.

The overhead compensation value is a minimum overhead compensation value in these examples. A set of overhead compensation values, which is used to adjust the observed metrics, may be adjusted to account for the execution environment overhead.

The calibrating of the metrics may be performed dynamically while the application is executing and while events are occurring. In other illustrative embodiments, the calibration of the metrics may occur in a post-processing phase after execution of the application has completed.

In this manner, the overhead associated with instrumentation may be removed from observed metrics to provide a more accurate identification of the overhead used by a particular application and execution. The different illustrative embodiments improve the calibration processes by separating the overhead for the language from the instrumentation overhead.

The execution environment overhead, in these examples, is the overhead imposed by the execution environment when no instrumentation exists. These values may be identified by running another application especially designed to generate data for the different sequences of method types and transition types that are desired. This application is examined without instrumentation to obtain the execution environment overhead associated with each sequence. This execution environment overhead replaces the adjustment of one instruction that was previously used. Any technique that allows for identifying the execution environment overhead may be used. In one embodiment, this identification is performed by manually examining portions of the generated code. In another embodiment, this is done by automatically examining the code generated for routines that have been carefully designed to demonstrate the overhead.

Figure 12:
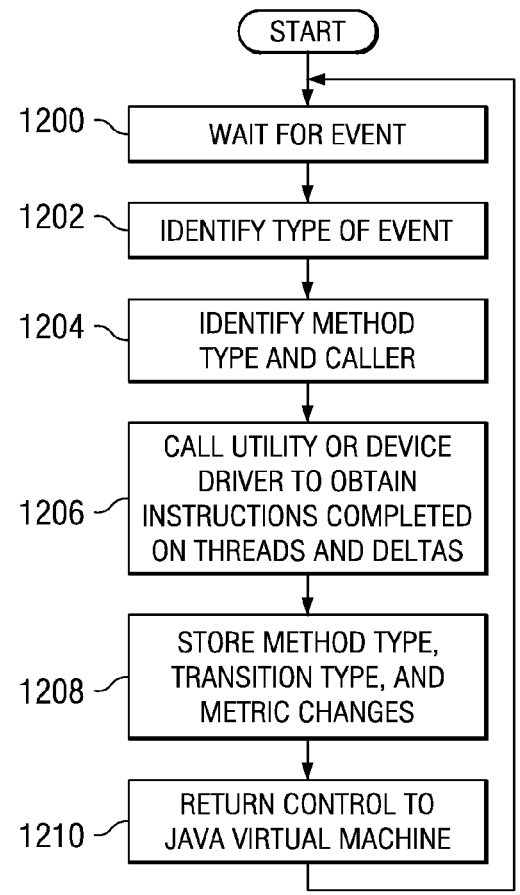
FIG. 12 is a high level flowchart of a process of identifying method times and transitions in accordance with an illustrative embodiment.

With reference next to FIG. 12, a high level flowchart of a process for identifying method times and transitions is depicted in accordance with an illustrative embodiment. The process illustrated in FIG. 12 may be implemented in a profiling process, such as profiler 400 in FIG. 4.

The process begins by waiting for an event (step 1200). Step 1200 involves waiting for a callout to be generated by an interface, such as interface 410 in Java® virtual machine 406 in FIG. 4. When a callout for an event occurs, the process identifies the type of event (step 1202). In these examples, the type of event may be identified from information in the callout itself. The event may be, for example, an entry or exit event.

Thereafter, the process identifies the method type and the caller (step 1204). The identification of these method types may be made from the event received by the process. Further, the caller of the method also is identified, in these examples, in step 1204.

Next, a utility or device driver is called to obtain new values of the metrics on the thread and deltas (step 1206). These values are instructions, in step 1206. This may be, for example, the current time or instruction being executed. The process then stores the method type, the transition type, and the metric changes (step 1208). The metric changes in step 1208 include, for example, changes caused by the execution of the instrumentation. As one example, one of the metrics may be the instructions completed for the thread. With this type of example, the instructions also include instrumentation instructions that are executed or have occurred since the last event.

Next, the control is returned to the Java® virtual machine (step 1210), with the process then returning to step 1200 as described above. At this point, execution of the application continues.

Figure 13:
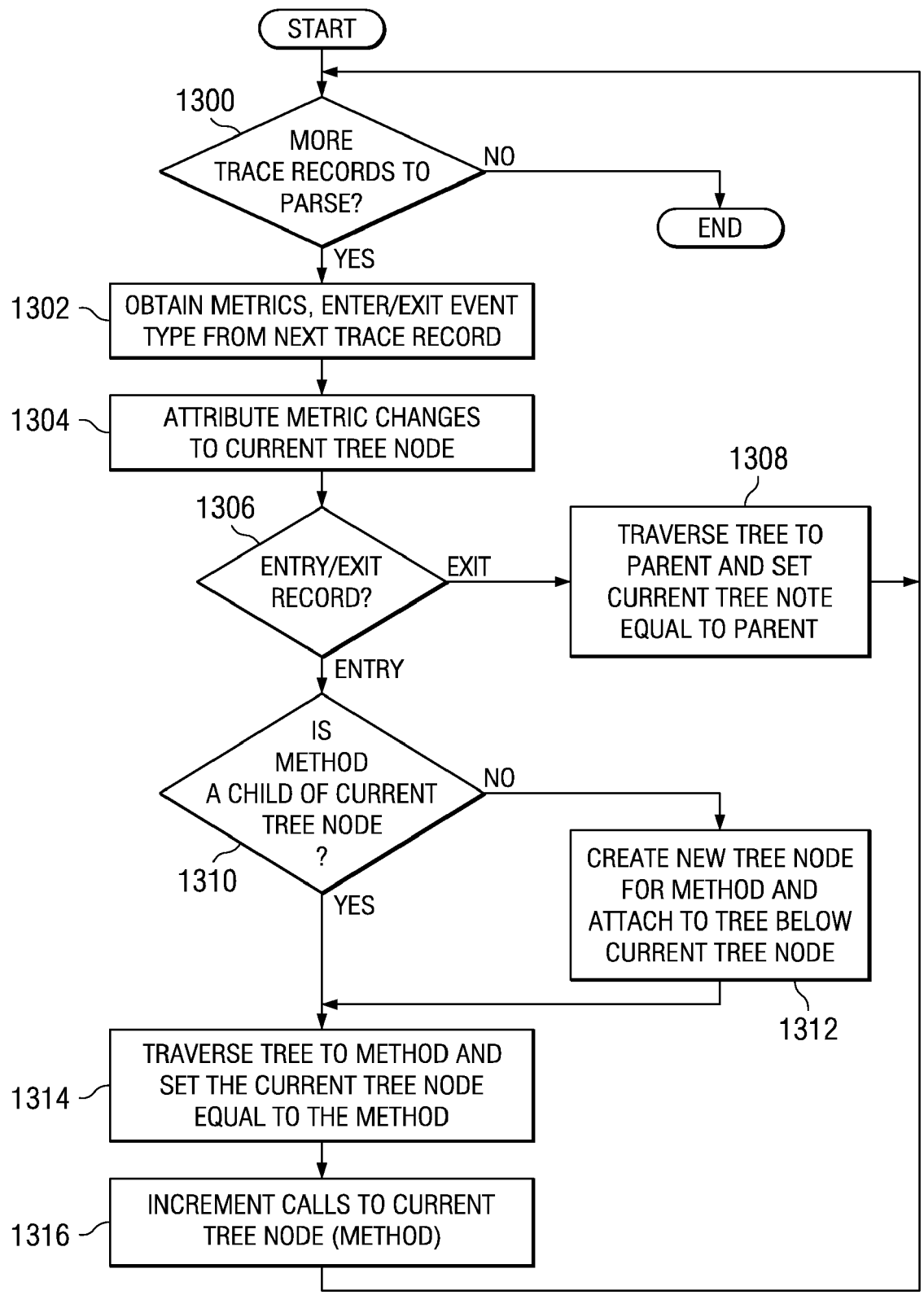
FIG. 13 is a flowchart of a process for building a call stack tree in accordance with an illustrative embodiment.

With reference now to FIG. 13, a flowchart of a process for building a call stack tree is depicted in accordance with an illustrative embodiment. In this example, the process illustrated in FIG. 13 is an example of a process that may be implemented in a process, such as profiler 400 in FIG. 4, to generate a call stack tree using trace data. In these examples, this process is used to build a call stack tree for illustrating entry and exit points for the different methods.

The process begins by determining whether more trace records are present in the trace text file (step 1300). If more trace records are present, several pieces of data are obtained from the trace record, including metrics and whether the event is an entry or an exit (step 1302).

Next, the last metric increment is attributed to the current node in the tree (step 1304). A check is made to determine if the trace record is an entry or an exit record (step 1306). If an exit record is present, the tree is traversed to the parent, using the parent pointer, and the current tree node is set equal to the parent node (step 1308). If the trace record in step 1306 is an entry record, a determination is made to determine if the module is already a child node of the current tree node (step 1310). If the module is not already a child node, a new node is created for the module and it is attached to the tree below the current tree node (step 1312).

The tree is then traversed to the module's node, and the current tree node is set equal to the module node (step 1314). In step 1310, if the module is already a child node, the process proceeds to step 1314, as described above. The number of calls to the current tree node is then incremented (step 1316). This process is repeated for each trace record in the trace output file, until there are no more trace records to parse. If there are no more trace records to parse in step 1300, the process terminates.

Figure 14:
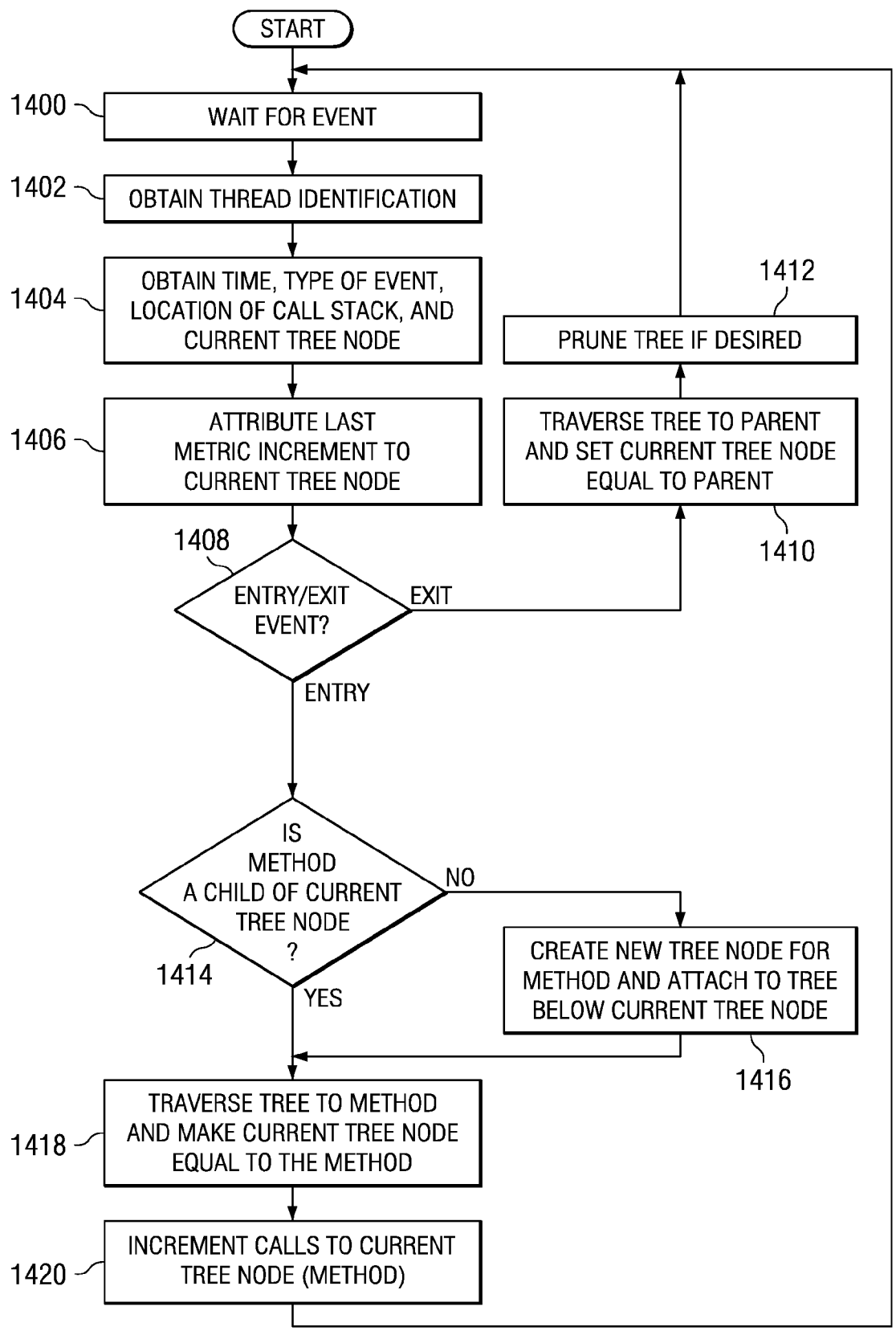
FIG. 14 is a flowchart of a method for dynamically building a call stack tree as tracing is taking place during system execution in accordance with an illustrative embodiment.

With reference now to FIG. 14, a flowchart depicts a method for dynamically building a call stack tree as tracing is taking place during system execution. The process illustrated in FIG. 14 may be performed using a profiler, such as profiler 400 in FIG. 4. In FIG. 14, as an event is logged, it is added to the tree in real time. Preferably, a call stack tree is maintained for each thread. The call stack tree reflects the call stacks recorded to date, and a current tree node field indicates the current location in a particular tree.

The process begins by waiting for an event (step 1400). When an event occurs, the thread identification is obtained (step 1402). The time, type of event, location of the thread's call stack, and location of the thread's "current tree node" are then obtained (step 1404). The type of event may be, for example, whether the event is an entry or exit. The last metric increment is attributed to the current tree node (step 1406). A determination is made to determine if the event is an entry or an exit event (step 1408).

If the event is an exit event, the tree is traversed to the parent (using the parent pointer), and the current tree node is set equal to the parent node (step 1410). At this point, the tree may be dynamically pruned in order to reduce the amount of memory dedicated to its maintenance (step 1412). The process then returns to step 1400 to wait for another event. Pruning is discussed in more detail below.

If the event is an entry event, a determination is made as to whether the method is already a child node of the current tree node (step 1414). If the method is not already a child node of the current tree node, a new node is created for the method, and it is attached to the tree below the current tree node (step 1416). The tree is then traversed to the method's node, and the current tree node is set equal to the method node (step 1418). In step 1414, if the method is already a child node of the current tree node, the process proceeds to step 1418, as described above. The number of calls to the current tree node is then incremented (step 1420). The process then passes control back to the executing module, returns to step 1400 to wait for the next event to occur.

One of the advantages of using the dynamic tracing/reduction technique described in FIG. 14 is its enablement of long-term system trace collection with a finite memory buffer. Very detailed performance profiles may be obtained without the expense of an "infinite" trace buffer. Coupled with dynamic pruning, the method depicted in FIG. 14 can support a fixed-buffer-size trace mechanism.

The use of dynamic tracing and reduction with dynamic pruning, in some cases, is especially useful in profiling the performance characteristics of long running programs. In the case of long running programs, a finite trace buffer can severely impact the amount of useful trace information that may be collected and analyzed. By using dynamic tracing and reduction and perhaps dynamic pruning, an accurate and informative performance profile may be obtained for a long running program.

Many long-running applications reach a type of steady-state, where every possible routine and call stack is present in the tree and updating statistics. Thus, trace data can be recorded and stored for such applications indefinitely within the constraints of a bounded memory requirement using dynamic pruning. Pruning has value in reducing the memory requirement for those situations in which the call stacks are actually unbounded. For example, unbounded call stacks are produced by applications that load and run other applications.

Pruning can be performed in many ways, and a variety of pruning criteria is possible. For example, pruning decisions may be based on the amount of cumulative time attributed to a subtree. Note that pruning may be disabled unless the amount of memory dedicated to maintaining the call stack exceeds some limit. As an exit event is encountered, such as in step 1408, the cumulative metric associated with the current node is compared with the cumulative metric associated with the parent node. If the ratio of these two cumulative metrics does not exceed a pruning threshold, then the current node and all of its descendants are removed from the tree. The algorithm to build the tree proceeds as before by traversing to the parent, and changing the current node to the parent.

Many variations of the above pruning mechanism are possible. For example, the pruning threshold can be raised or lowered to regulate the level of pruning from very aggressive to none. More global techniques are also possible, including a periodic sweep of the entire call stack tree, removing all subtrees whose individual cumulative times are not a significant fraction of their parent node's cumulative times.

Data reduction allows analysis programs to more easily and quickly answer many questions regarding metrics, such as, for example, how computing time was spent within the traced program. This information may be gathered from processes, such "walking the tree" and accumulating the data stored at various nodes within the call stack tree. This information may be processed to determine different metrics, such as, for example, the amount of time spent strictly within a routine, the total amount of time spent in the routine, and in other routines called by the routine either directly or indirectly.

Figure 15:
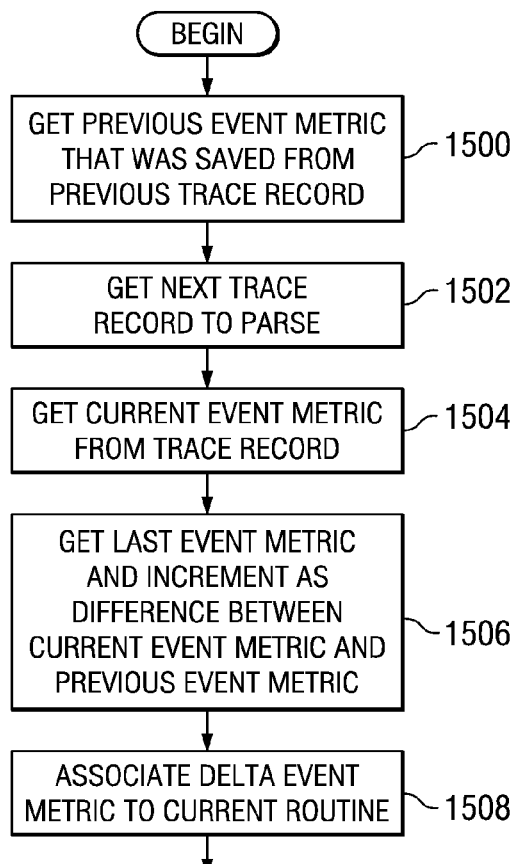
FIG. 15 is a flowchart of a process for identifying the difference between one event and another event in accordance with an illustrative embodiment.

With reference now to FIG. 15, a flowchart of a process for identifying the difference between one event and another event is depicted in accordance with an illustrative embodiment. The process illustrated in FIG. 15 may be implemented in a software component, such as profiler 400 in FIG. 4. In this example, the process in FIG. 15 may be used to attribute or associate the difference in a metric between one event and another event to a routine. This process may be applied to interpret how data is written to a trace file and to attribute changes in metrics recorded in a trace file among routines within execution flows. This process may be performed in a post processing phase or may be performed during profiling, depending on the particular implementation. In these examples, this process does not include taking into account instrumentation overhead.

Still referring to FIG. 15, the process begins by retrieving or obtaining the previous event metric that was saved from the previous trace record (step 1500). The next trace record in the trace data is then retrieved and parsed (step 1502). The current event metric is obtained from the information in the current trace record (step 1504). The process then obtains the last event metric and increase increments this value as a difference between the current event metric and the previous event metric (Step 1506). This difference represents the delta event metric, in these examples. The process then associates the delta event metric to the current routine (step 1508), with the process terminating thereafter. This delta event metric also may be referred to as a last metric.

Figure 16:
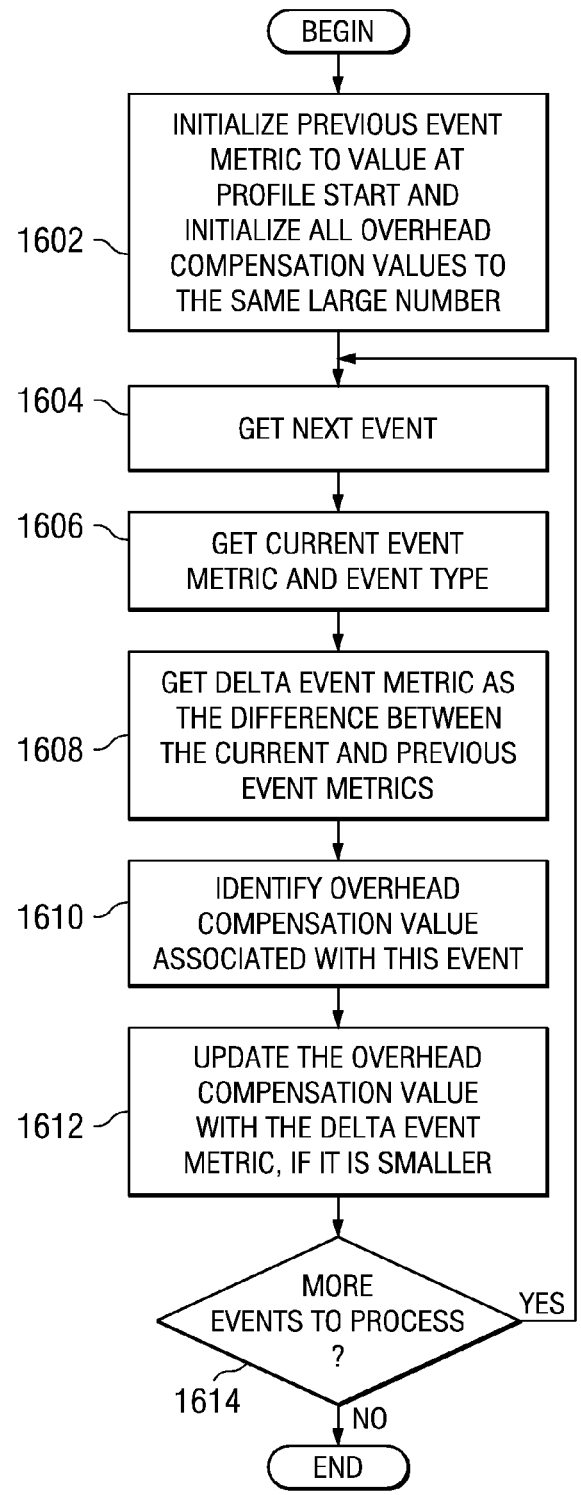
FIG. 16 is a flowchart of a process for obtaining or computing overhead compensation values to compensate for instrumentation overhead associated with entry events and exit events by methods in accordance with an illustrative embodiment.

With reference now to FIG. 16, a flowchart of a process for obtaining or computing overhead compensation values to compensate for instrumentation overhead associated with entry events and exit events by methods is depicted in accordance with an illustrative embodiment. The process illustrated in FIG. 16 may be implemented in a software component, such as profiler 400 in FIG. 4. This process may be used to adjust the value of a metric to take into account instrumentation overhead for a particular metric between events. This adjustment takes into account overhead that occurs from the instrumentation used to monitor the execution of an application. Overhead compensation values associated with each metric of interest may change over time.

For example, the delta metric may start at a large value and be replaced with a smaller value every time a smaller delta metric is observed. In some examples, time may be used as the metric while in other examples the number of instructions executed is the metric. Of course, these different processes may be applied to any type of metric of interest, such as cache misses.

The process begins by initializing various metric values, such as the overhead compensation values to the same large number (step 1602). An event in a trace record is retrieved from the trace file (step 1604) and parsed to obtain the current event metric and event type from the trace record (step 1606).

The current event metric is the current value of the metric of interest. The event type is the sequence of methods and method transitions. Each method type may have a different number of methods and transitions and method types and types of transitions. In the depicted examples, a sequence of two transitions and the methods in those transitions may be identified. In other embodiments, additional numbers of transitions and methods may be identified. In yet other embodiments, only a single method and transition may be used in identifying method types. As the sequence becomes larger, the number of event types increase.

The delta event metric is computed as the difference between the current event metric and the previous event metric (step 1608). The overhead compensation value associated with the event is identified (step 1610). The overhead compensation value is updated with the delta event metric if the delta event metric is smaller than the current value of the overhead compensation value (Step 1612). This step is used to identify the smallest value for the particular metric in identifying an overhead compensation value for the instrumentation overhead. If not, then the delta event metric is ignored and the process branches to handle other trace records.

A determination is then made as to whether more events are present in the trace data to be processed (step 1614). If additional events are present, then the process branches back to step 1604 to process another trace record. If additional events are not present, the process terminates. In this manner, the overhead compensation values may be used to identify overhead for various sequences of method types and transition types.

Figure 17:
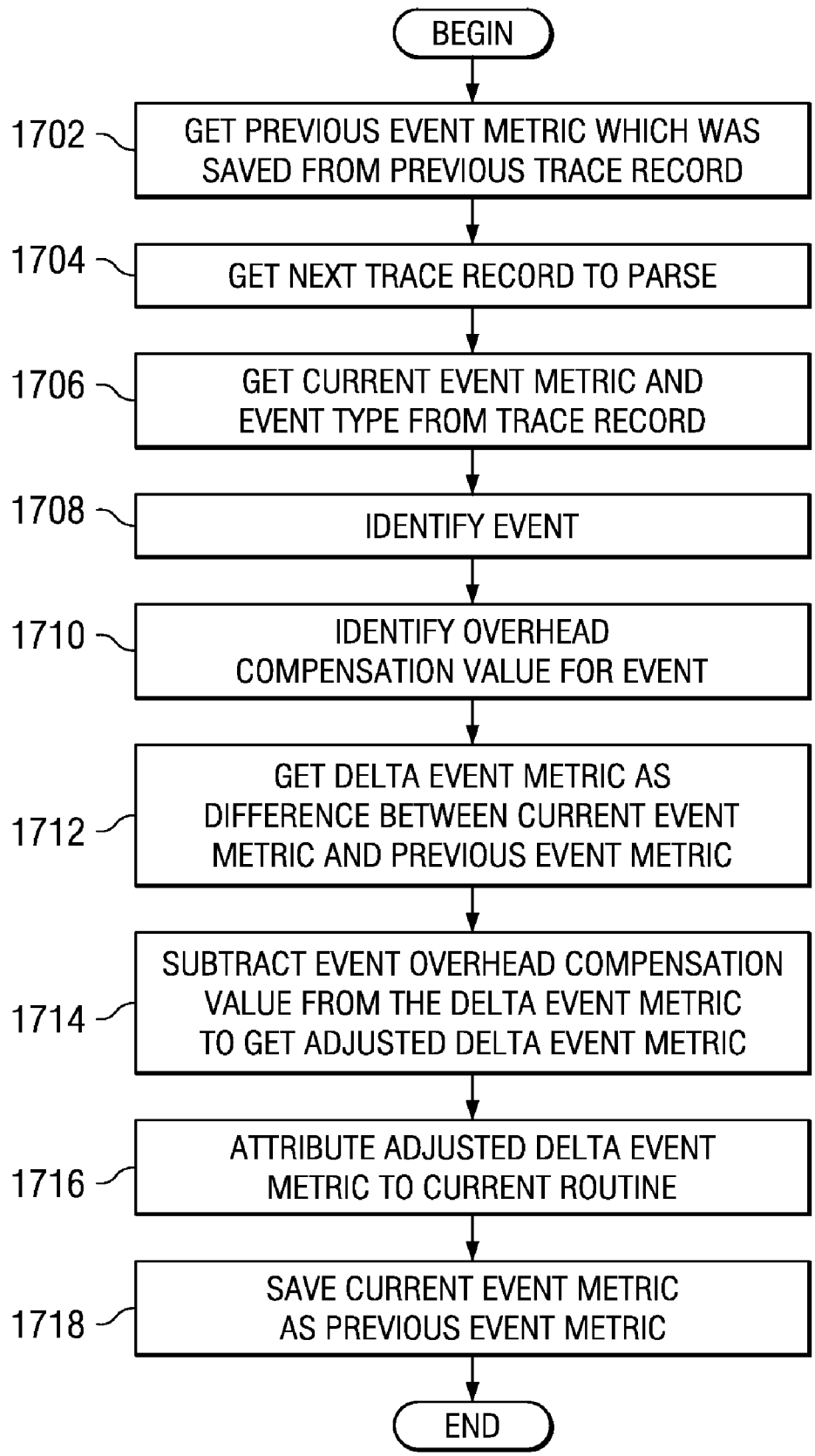
FIG. 17 is a flowchart of a process for adjusting trace records to take into account instrumentation overhead in accordance with an illustrative embodiment.

With reference now to FIG. 17, a flowchart of a process for adjusting trace records to take into account instrumentation overhead is depicted in accordance with an illustrative embodiment. The process illustrated in FIG. 17 may be implemented in a software component, such as profiler 400 in FIG. 4.

The process begins with the retrieval of a previous event metric that was saved from the immediately preceding trace record (step 1702). The process retrieves the next trace record from the trace file (step 1704) and parses it to obtain the current event metric and event type from the trace record (step 1706).

The event is identified (step 1708). Next, the overhead compensation value for the event is identified (step 1710). The process then subtracts the previous event metric from the current event metric to get the delta event metric (step 1712). The process then subtracts the event overhead compensation value from the delta event metric to get the adjusted delta event metric (step 1714). The process then attributes the adjusted delta event metric to current routine (step 1716).

The current event metric is saved as the previous event metric (step 1718), with the process terminating thereafter.

Thus, the different illustrative embodiments provide a computer implemented method, apparatus, and computer usable program code for identifying instrumentation overhead. The instrumentation overhead is identified for each type of event as described above. In the different illustrative embodiments, events in the form of a sequence of method and transition types are used to better identify the context in which instrumentation is applied to the metrics associated with an application. These identifications allow for more accurate calibrations. The different illustrative embodiments also provide a computer implemented method, apparatus, and computer usable program code for removing only the overhead associated with the instrumentation. The adjusted metrics represent an accurate estimate of the metrics associated with the uninstrumented application.

The invention can take the form of an entirely hardware embodiment, an entirely software embodiment or an embodiment containing both hardware and software elements. In a preferred embodiment, the invention is implemented in software, which includes, but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or input/output devices (including but not limited to keyboards, displays, pointing devices, etc.) can be coupled to the system either directly or through intervening input/output controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing events, the computer implemented method comprising:
    monitoring a set of events occurring during execution of an application to form a set of monitored events;
    identifying a plurality of sequences of method types and transition types from the set of monitored events to form an identified plurality of sequences of method types and transitions types, wherein each of the identified plurality of sequences of method types and transitions types type is a transition from one of a plurality of subroutines to another of a plurality of subroutines;
    identifying a plurality of execution environment overhead compensation values for the identified plurality of sequences of method types and transitions types to form a plurality of identified execution environment overhead compensation values, wherein each of the plurality of identified execution environment overhead compensation values corresponds to a different one of the plurality of execution environment overhead compensation values for the identified plurality of sequences of method types and transitions types; and
    adjusting observed metrics for the set of monitored events using the plurality of identified execution environment overhead compensation values.

2. The computer implemented method of claim 1, wherein the identifying and adjusting steps are performed during execution of the application while events are being processed.

3. The computer implemented method of claim 1, wherein the identifying and adjusting steps are performed after execution of the application has completed.

4. The computer implemented method of claim 1, wherein the step of identifying a plurality of sequences of method types and transition types from the monitored events comprises:
    storing a number of method types and a number of transition types for the plurality of sequences of method types and transition types during execution of the application.

5. The computer implemented method of claim 1, wherein the method types comprise at least one of jitted static methods, jitted non-static methods, interpreted static methods, interpreted non-static methods, native static methods, and native non-static methods.

6. The computer implemented method of claim 1, wherein the transition types comprise at least one of an entry and an exit.

7. The computer implemented method of claim 6, wherein the exit is a particular exit due to an exception.

8. The computer implemented method of claim 1, wherein the method types are identified by event types.

9. A data processing system comprising:
    a bus;
    a memory connected to the bus, wherein the memory stores computer executable instructions;
    a processor unit connected to the bus, wherein the processor executes the computer executable instructions to monitor a set of events occurring during execution of an application to form a set of monitored events; identify a plurality of sequences of method types and transition types from the set of monitored events to form an identified plurality of sequences of method types and transitions types, wherein each of the identified plurality of sequences of method types and transitions types type is a transition from one of a plurality of subroutines to another of a plurality of subroutines;
        identify a plurality of execution environment overhead compensation values for the identified plurality of sequences of method types and transitions types to form a plurality of identified execution environment overhead compensation values, wherein each of the plurality of identified execution environment overhead compensation values corresponds to a different one of the plurality of execution environment overhead compensation values for the identified plurality of sequences of method types and transitions types; and adjust a set of observed metrics for the monitored events using the plurality of identified execution environment overhead compensation values.

10. The data processing system of claim 9, wherein the computer executable instructions for identifying a plurality of sequences of method types and transition types from the set of monitored events to form an identified plurality of sequences of method types and transitions types; identifying execution environment overhead compensation values for the identified plurality of sequences of method types and transitions types to form the set of identified execution environment overhead compensation values; and adjusting the set of observed metrics for the monitored events using the set of identified execution environment overhead compensation values are executed during execution of the application while events are being processed.

11. The data processing system of claim 9, wherein the computer executable instructions for identifying a plurality of sequences of method types and transition types from the set of monitored events to form an identified plurality of sequences of method types and transitions types; identifying execution environment overhead compensation values for the identified plurality of sequences of method types and transitions types to form the set of identified execution environment overhead compensation values; and adjusting the set of observed metrics for the monitored events using the set of identified execution environment overhead compensation values are executed after execution of the application has completed.

12. The data processing system of claim 9, wherein in executing the computer executable instructions to identify a plurality of sequences of method types and transition types from the monitored events, the processor unit executes the computer executable instructions to store a number of method types and a number of transition types for the plurality of sequences of method types and transition types during execution of the application.

13. The data processing system of claim 9, wherein the method types comprise at least one of jitted static methods, jitted non-static methods, interpreted static methods, interpreted non-static methods, native static methods, and native non-static methods.

14. A computer program product for processing events, the computer program product comprising:
   a computer readable storage medium;
   program code, stored on the computer readable storage medium, for monitoring a set of events occurring during execution of an application to form a set of monitored events;
   program code, stored on the computer readable storage medium, for identifying a plurality of sequences of method types and transition types from the set of monitored events to form an identified plurality of sequences of method types and transitions types, wherein each of the identified plurality of sequences of method types and transitions types type is a transition from one of a plurality of subroutines to another of a plurality of subroutines; and
   program code, stored on the computer readable storage medium, for identifying a plurality of execution environment overhead compensation values for the identified plurality of sequences of method types and transitions types to form a plurality of identified execution environment overhead compensation values, wherein each of the plurality of identified execution environment overhead compensation values corresponds to a different one of the plurality of execution environment overhead compensation values for the identified plurality of sequences of method types and transitions types; and
   program code, stored on the computer readable storage medium, for adjusting a set of observed metrics for the monitored events using the plurality of identified execution environment overhead compensation values.

15. The computer program product of claim 14 further comprising:
   program code, stored on the computer readable storage medium, for storing a set of metrics for the events to form the set of observed metrics.

16. The computer program product of claim 14, wherein program code for identifying a plurality of sequences of method types and transition types from the set of monitored events to form an identified plurality of sequences of method types and transitions types comprises:
   program code, stored on the computer readable storage medium, for storing a set of metrics for the set of monitored events to form a stored set of metrics; and
   program code, stored on the computer readable storage medium, for identifying the plurality of sequences of method types and transition types from the stored set of metrics.

17. The computer program product of claim 14, wherein the program code, stored on the computer readable storage medium, for identifying a plurality of sequences of method types and transition types from the set of monitored events to form an identified plurality of sequences of method types and transitions types is executed after execution of the application has completed.

18. The computer program product of claim 14, wherein the program code for identifying a plurality of sequences of method types and transition types from the set of monitored events to form an identified plurality of sequences of method types and transitions types comprises:
   program code, stored on the computer readable storage medium, for storing a number of method types and a number of transition types for the plurality of sequences of method types and transition types during execution of the application; and
   program code, stored on the computer readable storage medium, for identifying the plurality of sequences of method types and transition types from the number of method types and the number of transition types during execution of the application.

19. The computer program product of claim 14, wherein the method types comprise at least one of jitted static methods, jitted non-static methods, interpreted static methods, interpreted non-static methods, native static methods, and native non-static methods.

20. The computer program product of claim 19, wherein the transition types comprise at least one of an entry and an exit.

* * * * *